United States Patent [19] [11] 4,121,852
Quanbeck [45] Oct. 24, 1978

[54] RELEASABLY RETAINED HINGED PLOW

[76] Inventor: Sherman H. Quanbeck, Aneta, N. Dak. 58212

[21] Appl. No.: 724,086

[22] Filed: Sep. 16, 1976

[51] Int. Cl.² .............................................. A01B 73/00
[52] U.S. Cl. ................................ 280/411 C; 172/311; 172/314; 172/328; 172/413; 172/633
[58] Field of Search ............... 172/310, 311, 314, 316, 172/328, 396, 400, 406, 413, 421, 581, 582, 584, 585, 586, 587, 589, 590, 619, 632, 633, 646, 650, 655, 695; 280/411 R, 411 C, 412; 56/385; 91/171, 413

[56] References Cited
U.S. PATENT DOCUMENTS

| 1,466,569 | 8/1923 | Stevens | 172/646 |
| 2,969,647 | 1/1961 | Raymond | 91/171 |
| 3,731,748 | 5/1973 | Sullivan et al. | 172/314 |
| 3,912,018 | 10/1975 | Brundage et al. | 172/328 |
| 3,965,989 | 6/1976 | Ward | 172/314 X |
| 3,983,944 | 10/1976 | Farrant | 172/314 |

FOREIGN PATENT DOCUMENTS

| 645,292 | 7/1962 | Canada | 172/310 |
| 7,202,127 | 5/1972 | Fed. Rep. of Germany | 172/633 |
| 1,557,749 | 4/1970 | Fed. Rep. of Germany | 172/328 |
| 2,061,840 | 7/1971 | Fed. Rep. of Germany | 172/311 |
| 453,144 | 11/1927 | Fed. Rep. of Germany | 172/633 |
| 498,921 | 4/1976 | U.S.S.R. | 172/413 |

Primary Examiner—Richard T. Stouffer
Attorney, Agent, or Firm—Nickolas E. Westman

[57] ABSTRACT

A moldboard plow that is made in two sections which are hinged together about a horizontal pivot axis, so that the rear section of the plow can pivot about this horizontal axis relative to the front section to permit the plow to follow ground contours. Such hinged plows are useful where the present day large plow assemblies are utilized. The hinge assembly also includes structure for reducing the overall width of the plow for road transport. The present hinged plow is supported at four support points controlled by hydraulic cylinders connected and controlled to insure that when the plow is lowered into the ground the shares will enter the ground at a favorable angle for penetration.

9 Claims, 9 Drawing Figures

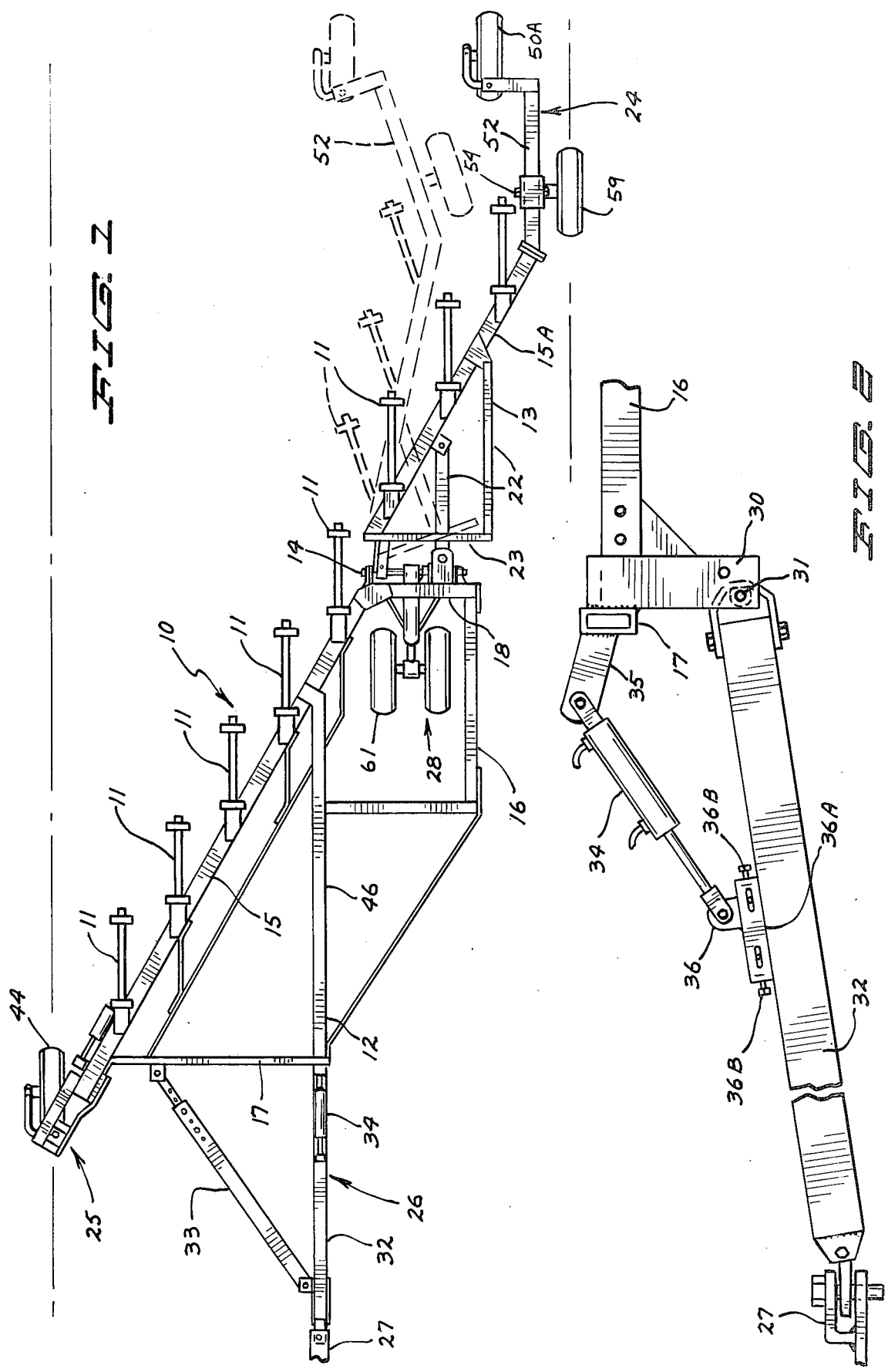

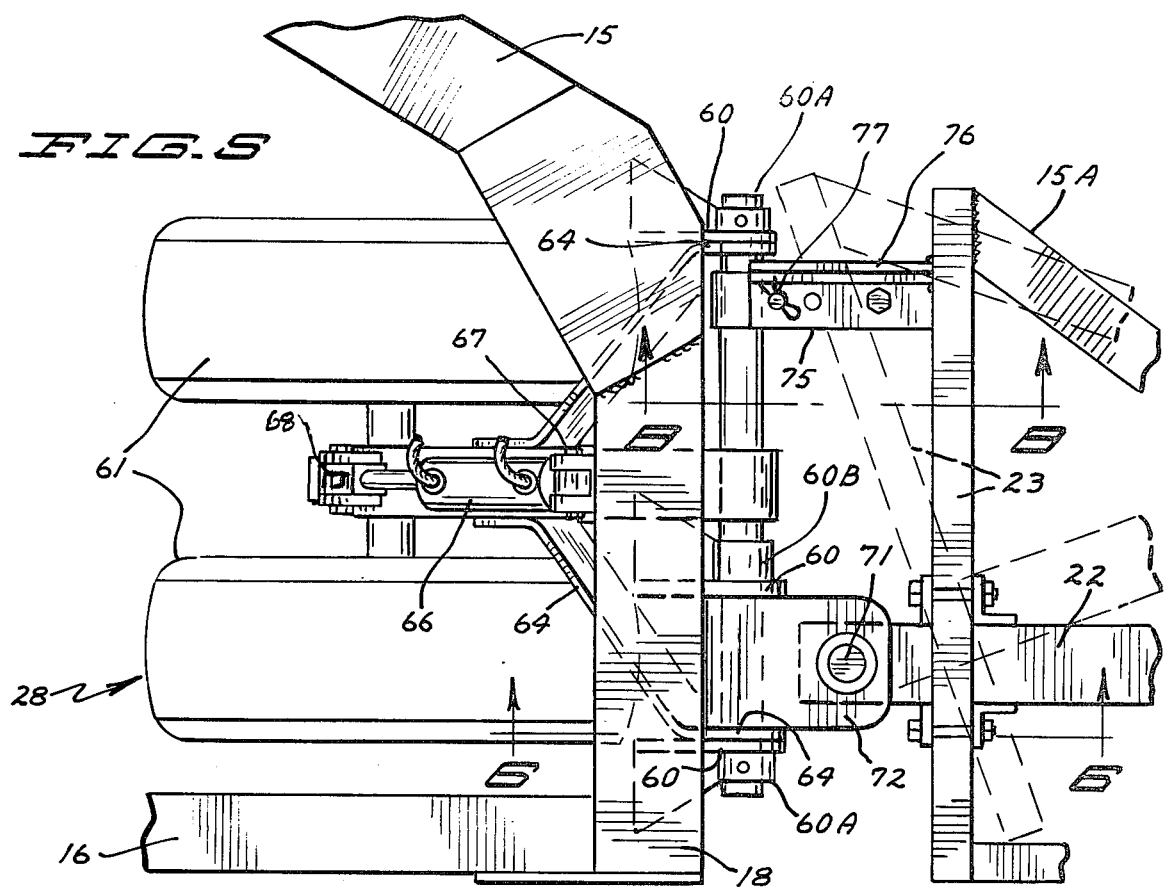
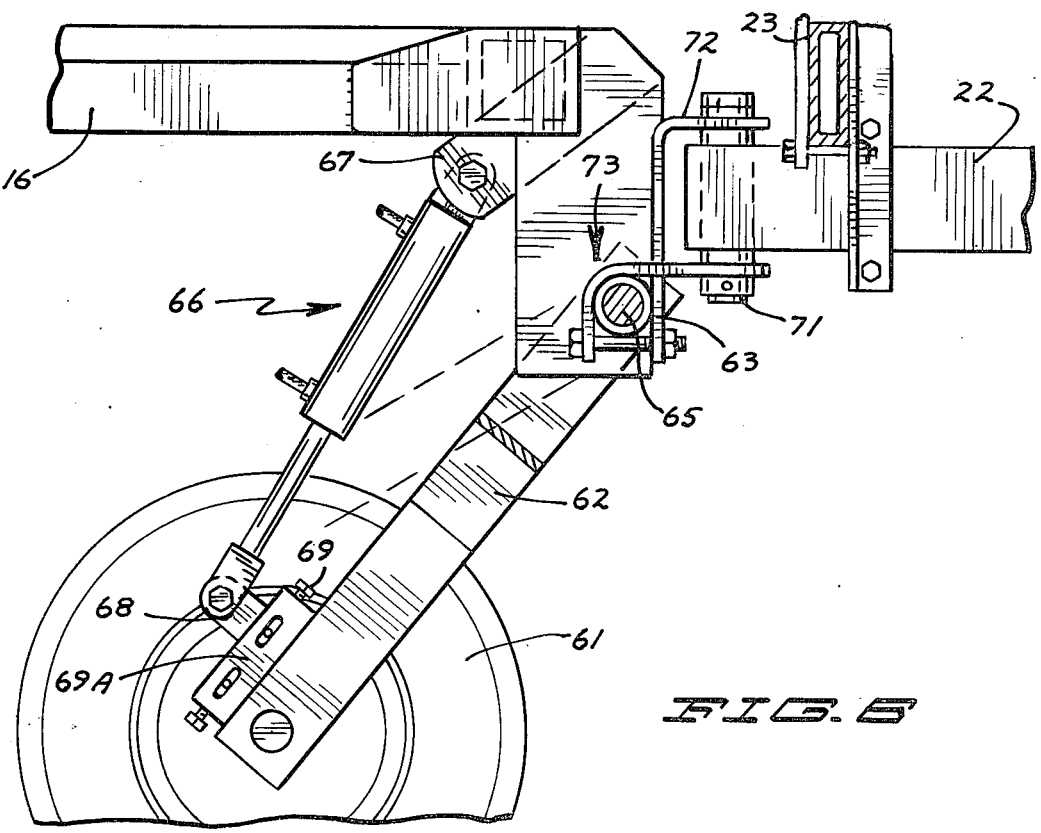

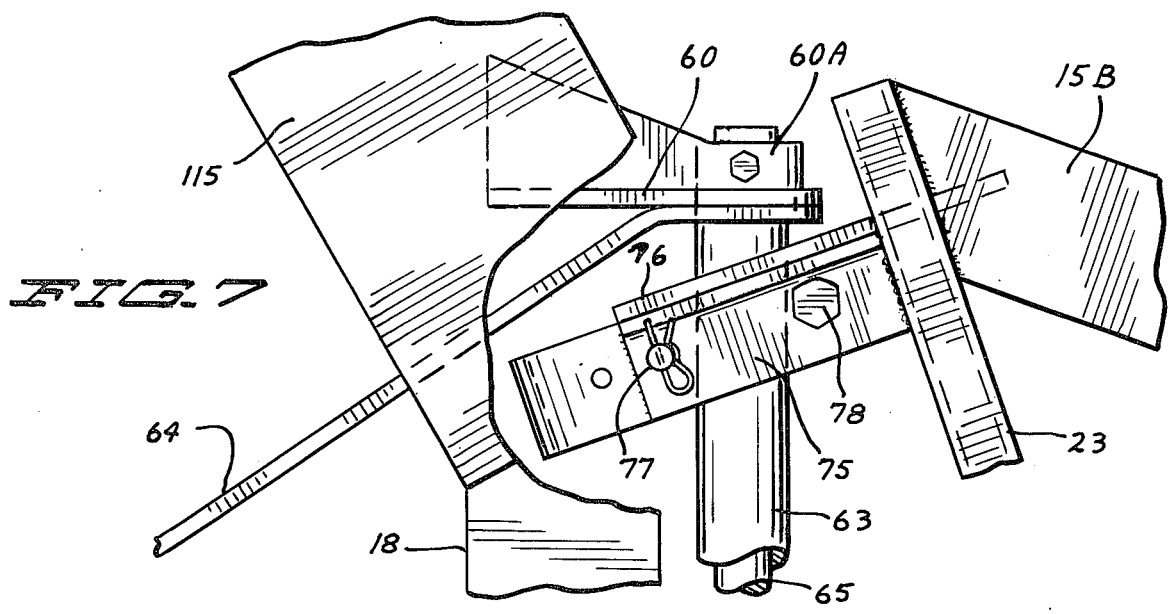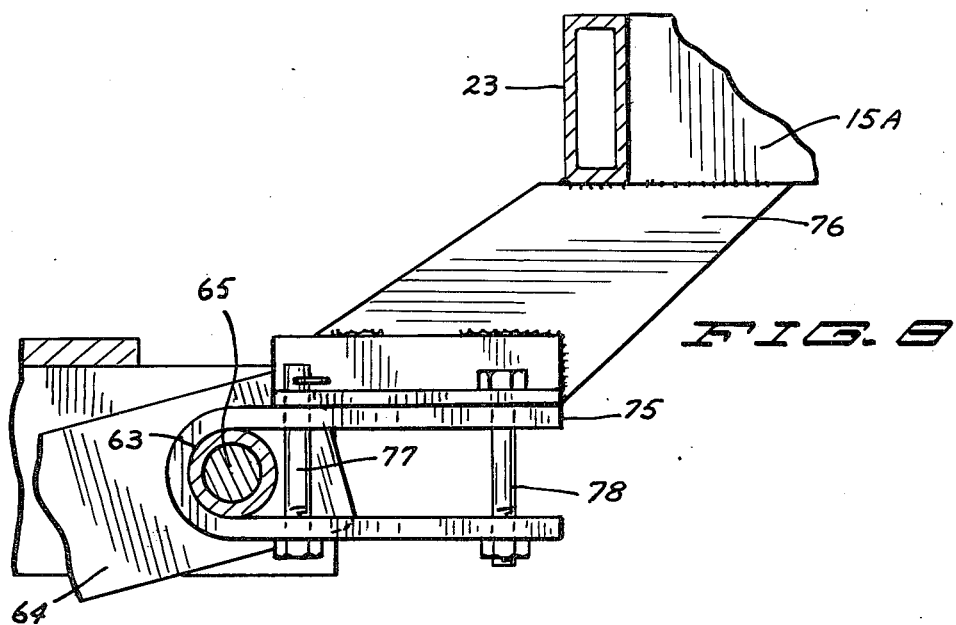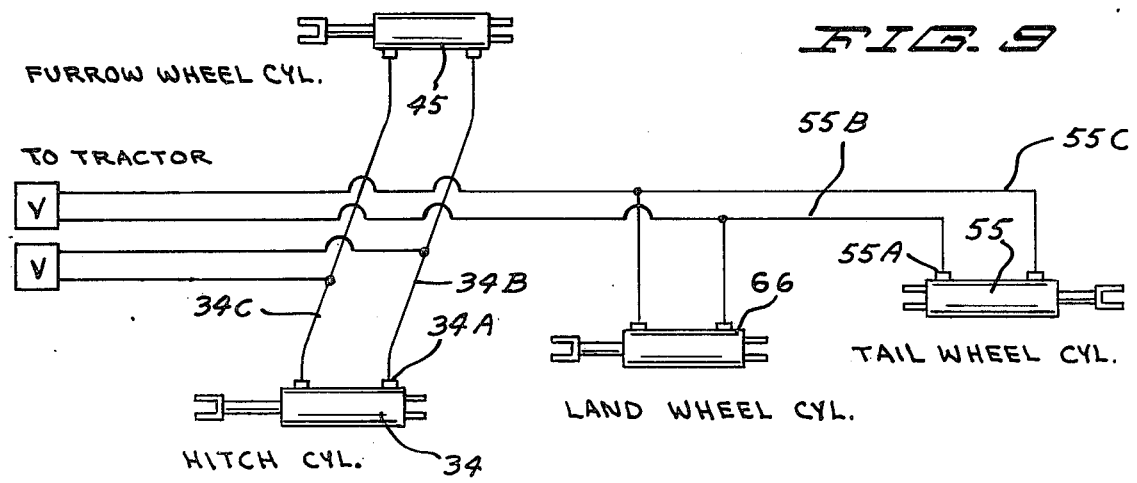

RELEASABLY RETAINED HINGED PLOW

BACKGROUND OF THE INVENTION

1. Field of the Invention

The present invention relates to moldboard plow assemblies, and more particularly to moldboard plows which are made to more than one section, and which sections are hinged together.

2. Prior Art

The use of two section, hinged plows is well known. However, the hinges are generally quite complicated to make, and do not permit connecting the plow so that the rear section can be moved laterally to trail the front plow section for road transport.

SUMMARY OF THE INVENTION

A hinged plow construction which permits a large plow assembly to be hinged in two sections about a horizontal axis, so that the trailing section can pivot relative to the front section and follow the contour of the ground more closely when plowing across such contours. This reduces loads on the plow frame and makes for a more even plowing operation. The individual bottoms will remain generally at the same depth regardless of irregularities in the land.

The plow hinge assembly, in addition to providing a wide, extremely stable hinge member about the horizontal axis also includes a separate pivot about a vertical axis so that the rear section of the plow can be pivoted to a position wherein it will trail behind the front section during road transport to reduce the overall width of the plow for such transport.

In the present device, the plow is supported in a unique manner. The supports include a front furrow wheel at the right front corner of the plow, which is conventional and a tandem support wheel near the rear of the front section, just ahead of the hinge assembly which can be raised or lowered for depth control. The plow hitch pole is attached to a tractor drawbar and to the main frame of the plow. A hydraulic cylinder controls the pivoting of the plow hitch pole relative to the main frame of the plow and transfers the load at the left front corner of the main frame of the plow to the hitch pole which in turn is supported on the tractor drawbar. This cylinder is also controlled to uniformly lower the plow into the ground by controlling the speed with which the hydraulic circuit operates to insure that the shares of the plow will enter the ground at a proper angle for good penetration.

Additionally, the tail wheel, which is of generally conventional design, is used for raising and lowering the rear portion of the rear section of the plow, and the front portion of the rear section is attached and controlled in depth by the hinge construction.

The hinge incorporates a vertical pivot to provide for adjustment of the plow to a road transport position. The unique feature of individually controlling four support points of the hinge type plow with hydraulic cylinders, and utilizing a cylinder to control the position of the forward left corner of the main frame of the plow relative to the tractor hitch, simplifies the support of the front of the plow.

BRIEF DESCRIPTION OF THE DRAWINGS

FIG. 1 is a part schematic top plan view of a hinged plow made according to the present invention;

FIG. 2 is a side view of the left front corner of the main frame showing an attachment of the plow hitch pole to the main frame;

FIG. 5 is an enlarged top plan view of the hinge portion showing the rear portions of a front section of the plow and the front portions of a rear section of the plow in greater detail;

FIG. 6 is a sectional view taken as on line 6—6 in FIG. 5;

FIG. 7 is a fragmentary detailed top view showing details of the device for the rear section of the plow pivoted to a transport position;

FIG. 8 is a sectional view taken as on line 8—8 in FIG. 5; and

FIG. 9 is a schematic representation of a hydraulic circuit used for the individual cylinders that control and support portions of the plow.

DESCRIPTION OF THE PREFERRED EMBODIMENTS

Figure 3:
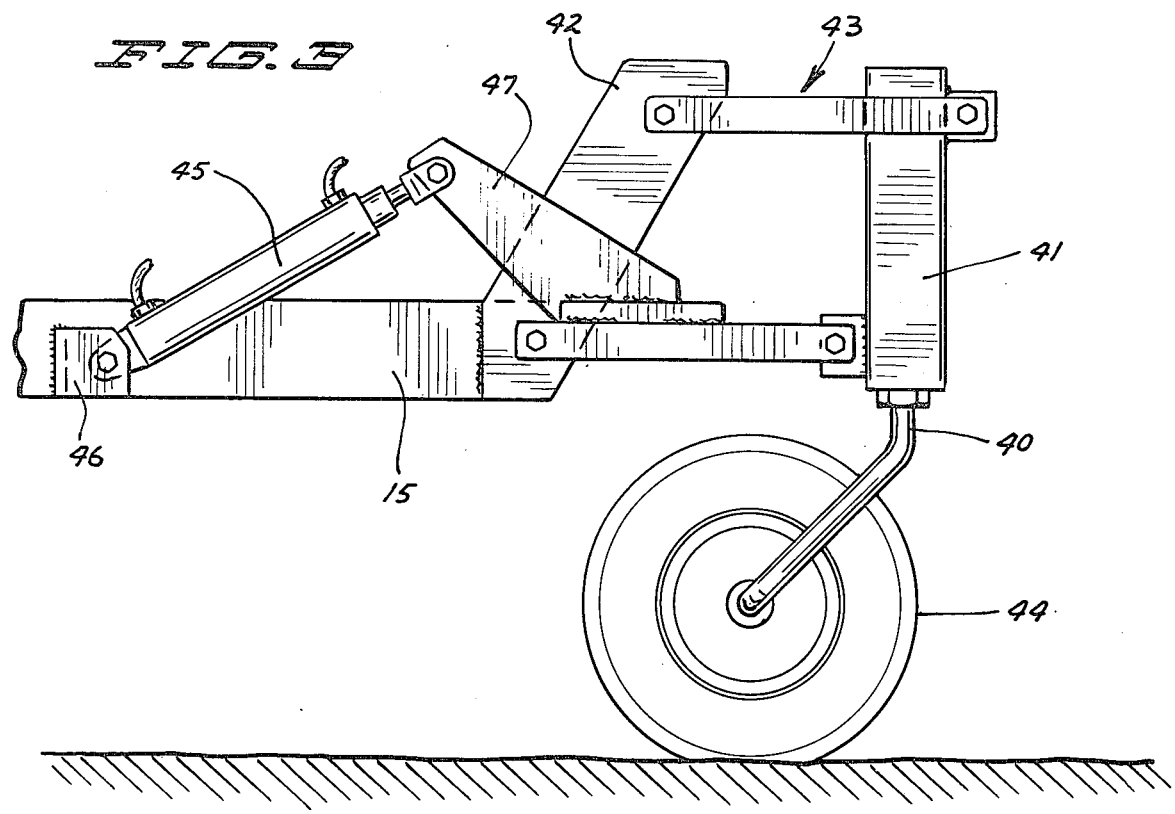
FIG. 3 is a part schematic view of a means for mounting, and raising and lowering a furrow wheel at the right front corner of the main plow frame.

A plow indicated generally at 10 as shown is a moldboard type plow, having a plurality of moldboards or bottoms and only the upper portions are shown and represented generally at 11. The preferred plow bottom is of a type which will release individually under load, for example those shown in my copending U.S. application Ser. No. 690,858, filed May 28, 1976 for Floating Beam Plow. The representation in FIG. 1 shows the spring mounting assembly for the plows.

With the present high horsepower tractors, there are commonly plows that have anywhere between 8 to 13 bottoms or moldboards in a single plow assembly. If the plow frame is rigid for the entire length of the plow it becomes unwieldly and is unable to follow contours of the land so that some of the moldboards or bottoms may be plowing in uneven depths. Also, a long main beam or frame has to be excessively heavy and it is practically impossible to make economically.

The present plow includes a forward or front frame assembly or section 12, and a rear frame assembly or section 13, which are connected together by a hinge assembly illustrated generally at 14. In the form shown there are five bottoms on the front section 12 and three bottoms on the rear section 13.

The plow frame sections each include a main plow beam 15 and 15A, respectively, to which the bottom assemblies 11 are attached. A main plow beam is shown in my previously mentioned copending U.S. application, and as can be seen the beams extend obliquely or at an angle with respect to the direction of movement of the plow. The front frame section 12 has frame members 16 that extend in fore and aft direction, and has a cross frame member 17 that ties the unit together. A rear cross frame member 18 also is utilized at the rear of the front section, and suitable bracing can be provided as desired. The frame members are connected together for rigidity as desired.

The rear frame section 13 includes the main beam member 15A, a fore and aft extending frame member 22, and a front frame member 23. At the rear of the rear section 13 there is a tail wheel assembly 24 that is mounted to the rear of the main beam 15A and which is utilized for raising and lowering the rear portion of the rear plow section. The front frame section 12 is supported at the right front corner through a furrow wheel assembly indicated generally at 25. The front frame section is partially supported through the plow hitch pole assembly 26, which is mounted at the left hand side of the cross frame member 17 as shown in FIG. 1. The pole assembly 26 is supported on a tractor drawbar 27, and the drawbar partially supports the weight of the front corner of the plow. A tandem support wheel assembly indicated generally at 28 is utilized at the rear portions of the front frame section, and the details of this wheel assembly 28 will be shown when the hinge is explained in detail. The rear of the front frame section 12 and the front of the rear frame section 13 therefore are both supported through the tandem wheels 28 which operate as a land wheel running on unplowed ground.

The land wheel 28, the furrow wheel 25, the hitch pole 26, the tail wheel 24 are individually controlled by hydraulic cylinders to permit raising and lowering of the plow during operation. The depth of the plow can be adjusted by having suitable stops on each of the wheels or on the cylinders to insure that the plow is operated at its desired depth.

Referring now to FIG. 2, the plow hitch pole 26 is shown. The forwardly extending frame member 16 and the cross member 17 support a pair of depending legs 30 that have the hitch pole assembly 26 pivotally mounted to the lower ends of the legs about a pivot axis 31. The main pole member 32 has an angle adjustment brace 33 that is adjustable in length to control the angle of a main hitch pole 32 about an upright axis (the pole 32 is connected to the pivot 31 through a clevis arrangement) and also the brace 33 distributes the load across the front frame member 17, which ties into a rearwardly extending brace immediately ahead of the main beam.

A double acting hydraulic cylinder assembly indicated generally at 34 is connected between a lug 35 that is fixed to the cross frame member 17, and an adjustable ear 36 that is mounted onto the pole 32. This ear 36 is slidably mounted in a guide housing 36A and can be adjusted longitudinally along the guide housing and pole through the use of adjustment screws that are threaded into end walls in the housing 36A. This provides adjustment for the depth where the left front corner of the plow frame stops when the cylinder 34 is retracted as the plow is lowered into the ground.

The pole 32 is attached to the tractor drawbar 27 so that it is supported on the drawbar and transfers load to the drawbar.

The right front corner (the furrow wheel corner) of the plow is supported through the furrow wheel assembly 27. The furrow wheel itself is castered about a vertical axis, through a support shank 40, that is castered for pivotal movement in a support tube 41 in a conventional manner. The tube 41 is connected to an upright portion 42 of the plow frame through a parallel linkage 43 in a conventional manner. The vertical position of the furrow wheel assembly, including the furrow wheel 44 is controlled through the use of a hydraulic cylinder 45 that is connected to the main beam 15 with a support ear 46. The cylinder 45 is connected to control the parallel linkage assembly 43 through an arm 47 that is fixed to the lower one of the links 43. Upon extension and retraction of the piston rod, the arm 47 will cause the lower link of the parallel link assembly 43 to pivot about its pivotal mounting to the support member 42, and this of course will cause corresponding pivoting of the upper parallel link in the assembly. The caster tube 41 will then raise and lower, raising and lowering the caster shank 40 and the wheel 44 so that the height of the front corner of the plow frame is thus controlled.

The furrow wheel 44 will be run in the furrow of the rearmost bottom that is left from the previous pass of the plow. The depth of the furrow wheel can be controlled by a stop collar on the cylinder rod as in a conventional manner, or other suitable stops may be used for depth control.

Figure 4:
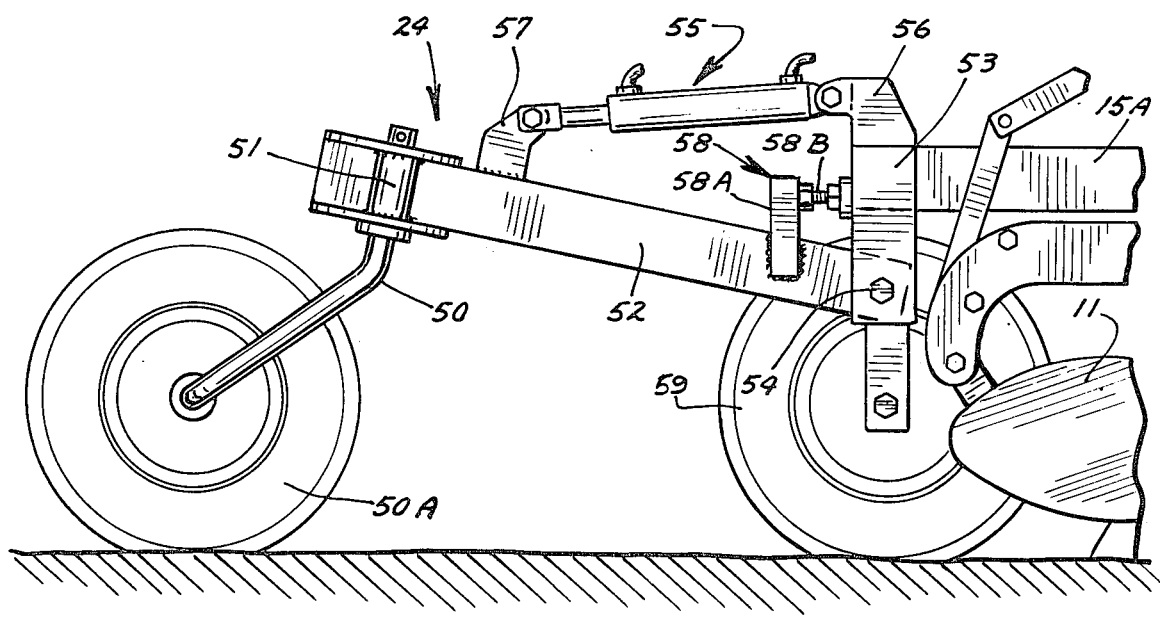
FIG. 4 is a side elevational view of a tail wheel mounting assembly and depth control cylinder of the plow of FIG. 1.

The tail wheel assembly 24 of the plow (FIG. 4) is also a caster wheel, having a caster shank 50 that is mounted into a suitable pivot tube 51. The pivot tube 51 is in turn attached to a control arm 52 that is pivotally mounted to a support 53 that in turn is attached to the main beam 15A. The pivot 54 for the arm 52 permits raising and lowering the arm to control the height of the rear end of the rear section 13 of the plow. A hydraulic cylinder assembly 55 is utilized for this purpose, and it is attached between a support 56 on the main frame, and an ear 57 on the arm 52.

Each of the hydraulic cylinder assemblies is a conventional double acting cylinder having a piston and rod assembly operable in response to fluid under pressure.

The wheel 50A on the shank 50 will caster about a vertical axis and depth control can be obtained through the use of a gage wheel 59, as well as a suitable stop on the arm 52 which is indicated generally at 58. The stop can be adjustable, so that a lug 58A fixed on the arm 52 will stop against an adjustable bolt 58B on the frame of the plow. The stop will determine how deep the rear end of the rear frame section will go when the plow is lowered into the ground.

The tandem land wheel assembly 28 is shown in connection with the hinge 14 in FIGS. 5, 6 and 7. As can perhaps best be seen in FIG. 5, the rear cross member 18 has three downwardly depending supports 60 that are spaced apart as shown. These supports are fixed to the cross member securely, and each of the end (outside) supports has a bushing 60A welded thereto. The center support has a downwardly open inverted "U" shaped support 60B at its lower end.

The tandem wheel assembly 28 comprises a pair of tandem wheels 61,61 that are mounted on the suitable axle that is fixed to a support leg 62. The support leg 62 in turn is welded to a tube at its end opposite from the wheels 61. This tube 63 is also welded to braces 64. The tube extends across the width of the machine, and will slip between the end bushings 60A and will fit up into the downwardly open U-shaped center support 60B. This tube 63 then can be slipped up into place between the bushings 60A, and a heavy pin 65 can be slid through the tube and the bushing 60A, to support the land wheel axle in position for pivoting about the horizontal and transverse axis of the pin 65. Downward loads are carried to this tube 63 by the center support 60B.

The relative position of the leg 62, and thus the wheels 61 about the axis of pin 65 is controlled by a hydraulic cylinder assembly 66 that is attached to an ear 67 that is fixed to the rear cross member 18 of the front section of the plow frame, and also to an adjustable block 68, that can be adjusted along the length of the leg 62 through the use of a suitable set screw 69 at the end of a housing 69A. The block 68 can slide between plates of the housing 69A on opposite sides of the block. The set screws 69 are threaded through end plates of the housing and will bear against the block 68. Bolts can be passed through the slots shown in the walls of the housing 69A and through the block to retain it in position. Extending and retracting the rod of cylinder assembly 66 will raise and lower the rear portion of the front section of the plow frame by pivoting the leg 62 about the axis of the pin 65.

The front end of the rear plow section is supported on the axle tube 63, and as shown, the main fore and aft frame member 22 of the plow rear section extends ahead of cross member 23 and is pivotally connected with a vertical pin 71 in a clevis 72. The clevis 72 has a downwardly open generally U-shaped saddle section indicated generally at 73 that slips over the axle tube 36 between two of the support plates 60. The clevis 72 can be held in place with a suitable bolt 74. The pin 71 carries the loads from the rear plow section to the axle tube 63, and clevis 72 rests on the downwardly open U shapped saddle member 73 and can pivot about the tube 63 if the rear end of the plow moves vertically relative to the front section of the plow. Thus, there is a horizontal pivot axis (the axis of tube 63 and pin 65) that extends transversely of the plow and that permits the plow sections to follow the contours of the ground more closely, during plowing operation.

The right corner of the front cross member 23 of the rear plow section is also supported on the axle tube 63 through the use of a clevis member 75. Clevis 75 is a rearwardly open U-shaped saddle member and is supported through a gusset assembly 76 welded directly to the rear main beam 15A and cross member 23 and is rigid with respect to the rear section of the plow. The rear portion of the clevis is open so that the axle tube 63 can be slipped into the clevis when the plow is assembled. The axle tube 63 supports the clevis 75 and thus the right front corner of the rear plow section. The clevis is held on the axle tube wth a clevis pin 77 that, as shown, when in plowing position will be in the hole that is adjacent to the axle tube as shown in FIG. 5 so that the clevis cannot slide relative to the axle tube. Also, an end bolt 78 can be inserted in the clevis to keep it from slipping off the tube. When the plow is to be transported on the road, the pin 77 is removed from its position shown in FIG. 5, and the tractor and plow can be turned sharply to the right. This will swing the front end of the front frame section of the plow to the right, and this will then shift the front cross member 23 and the rear frame section 13 about pin 71 relative to the tube 63 as shown in dotted lines in FIGS. 1 and 5. The end of the clevis 75 will move forwardly from the tube 63, and then the clevis pin 77 can be put into the hole as shown in FIG. 7 to lock the rear frame section in its angled position. The rear end of the plow is held to the right of its normal plowing position as shown in FIG. 1. The rear section thus trails the front section, reducing the overall transverse width of the plow so that road travel is possible even with a large plow.

When the plow is to be used in the field, the pin 77 can be removed from the position shown in FIG. 7, and the front of the plow turned to the left. The rear frame section will again pivot around the axle pin 71 so that the end of the clevis 75 is against the tube as shown in FIG. 5. Then the pin 77 is put in position shown in FIG. 5 and the plow is ready to be used in the field wherein the rear portions of the rear frame section are transversely offset from the front frame section as shown in FIG. 1.

The hinge assembly 14 thus insures not only that the plow will follow the contours of the ground, but is designed so that the plow can conventionally and easily be reduced in overall width for road transport. The hinge serves a multiple function. The tube 63 serves to hold the tandem land wheels securely and also provides a wide area for the hinge clevis 77 to avoid excessive wear.

In hinged plows it has been found that individual control of four support points of the plow is desirable. The present device permits individual control of four support locations by using a hydraulic cylinder assembly between the hitch pole and the main frame for supporting the left front corner or land side front corner of the plow. It also has been known that it is desirable to have the front end of the plow go in the ground first, and out of the ground first while the back part of the plow goes in last and out of the ground last as well.

There is some weight differential at the four support locations. For example the furrow wheel assembly 25 carries more weight than the hitch pole 26. In this particular plow, a somewhat smaller cylinder can be used on the hitch pole 26 because of the lighter weight supported. In order to obtain the desired action when the plow is put into the ground or lifted out of the ground, the hydraulic circuitry illustrated in FIG. 9 is utilized. As can be seen, the two front cylinders are hooked in parallel from a common valve, and the furrow wheel cylinder 45 (which is a double acting cylinder), as well as the hitch cylinder 34 are shown. A restrictor 34 (orifice member) is placed into the base end connection of the hitch cylinder 34, but no restrictors are placed into the connections to the cylinders 45. Thus, when pressure is supplied to the line 34B which would be tending to raise the plow, the furrow wheel cylinder will tend to raise more quickly because of the lack of restrictors. Because the hitch cylinder has lesser load and is a smaller size, the plow will actually lift out of the ground at its front end substantially level.

When the front end of the plow is to be placed into the ground the hydraulic valve that controls both cylinders 34 and 45 will be actuated and fluid under pressure will be supplied to the line 34C leading to the rod ends of both of the cylinders 34 and 45. The plow front end lowers into the ground substantially level. This means that the plow bottoms will enter the ground at a favorable angle for penetration, and this is done merely by hooking the front cylinders in parallel.

Likewise, the circuit for the land wheel cylinder 66 and the tail wheel cylinder 55 is a parallel circuit as shown in FIG. 9. Again, here, it is desirable to have the front end of the rear section of the plow enter the ground first, and also to lift out first. Thus, a restrictor orifice 55A is placed into the base end fitting on cylinder 55 leading from the line 55B that connects the base ends of both the cylinders 55 and 66. The rod ends are also connected by a common line 55C. When the valve is operated to lift the plow out first, and the tail wheel cylinder 55 will follow because of the restrictor 55A. When the plow is to be lowered into the ground, the unrestricted flow from the base end of the land wheel cylinder 66 will permit the land wheel assembly to lower the front end of the rear section of the plow, (and the rear section of the front end of the plow) more quickly than the tail wheel cylinder will react causing the plow to enter the ground properly.

The use of restrictors in the hydraulic cylinders, and utilizing two sets of parallel connected cylinders for controlling the two sections of the plow permits proper action while minimizing the mechanical linkage necessary, and eliminating the need for mechanically interconnecting the support points of the plow. The hitch pole cylinder also eliminates the need for a front axle and wheel at the left front corner of the plow.

Thus, the plow comprises two individual plow frame sections that are joined together and will hinge about a horizontal axis between the sections, and which plow assembly is supported in four points by individual hydraulic cylinders with the two forward cylinders being joined in parallel and flow restricted to the land side of the frame so the front bottom enters the ground in working position, and the two cylinders for the rear portions of the plow joined in parallel and having selected flow restriction to the tail wheel cylinder to insure that the front end of the rear section enters the ground first.

The main pin 71 forms the main pulling pin for the rear plow section and also the pivot pin or reducing the overall width of the plow for transport. When the plow is placed into transport position there is no need to change the hitch pole setting or to change axle position. Only one pin has to be removed and replaced.

What is claimed is:

1. In a hinged plow assembly including a forward frame section and a rear frame section, means to permit the forward end of the forward frame section to be connected to a prime mover for movement over the ground with the rear frame section trailing the forward frame section, hinge means connecting said forward frame section and rear frame section together and permitting hinging movement about a generally horizontal transversely extending axis as the assembly is moved, said frame sections each carrying a plurality of earth working tools, said rear frame section having rear portions which are offset from said forward frame section in transverse direction when in use, so that rear portions of the rear frame section extend beyond the side of said forward frame section on at least one side in transverse direction as the plow assembly is moved along the ground, means to pivotally connect a forward end portion of said rear frame section to a rear end portion of the forward frame section about an upright axis, and means to releasably retain said rear frame section selectively in at least two separate positions about said upright axis relative to said forward frame section, one of which is a working position and the other is a position wherein rear portions of the rear frame section are moved transversely to reduce the overall transverse width of the plow assembly from the width in working position as the plow assembly is moved along the ground.

2. The plow of claim 1 and wheel means adjacent the hinge means on one of said frame sections to support both frame sections relative to the ground adjacent said hinge means.

3. The plow of claim 1 wherein said hinge means comprises a horizontal support tube on one of said sections, and a pair of spaced U-shaped saddle members on the other of said sections which engage and are supported on said tube.

4. In a hinged plow assembly including a forward section and a rear section, hinge means connecting said forward section and rear section together about a horizontal axis comprising a generally horizontal support tube on one of said sections, and a pair of spaced U-shaped saddle members on the other of said sections which engage and are supported on said tube, means to pivotally connect said rear section to the forward section about an upright axis, said upright axis being located on one of said saddle members, the other of said saddle members having generally horizontal legs and being slidable generally horizontally relative to said tube, and means to releasably retain said rear section selectively in two separate positions about said upright axis relative to said forward section, one of which is a working position and the other is a position wherein the overall lateral width of the plow assembly is reduced from the width in working position, said other saddle member comprising a portion of said means to releasably retain.

5. In a hinged plow assembly including a forward section and a rear section, hinge means connecting said forward section and rear section together about a generally horizontal axis, means to pivotally connect said rear section to the forward section about an upright axis, a land wheel assembly, means to mount said land wheel assembly to one of said sections adjacent said hinge means to support the plow assembly relative to the ground, said land wheel assembly comprising an arm, wheel means at one end of said arm, and means to support the other end of said arm on said one section comprising an axle tube extending across said one section and pivotally supported on said one section, said axle tube comprising a portion of said hinge means, and means to releasably retain said rear section selectively in two separate positions about said upright axis relative to said forward section, one position being a working position and the other being a position wherein the overall lateral width of the plow assembly is reduced from the width in working position.

6. The plow of claim 5 wherein said tube is pivotally mounted on a support pin, and said hinge means comprises a clevis member having a downwardly open saddle that pivotally rests on said tube, said clevis member further including a pair of vertically spaced generally horizontal members, the other section of said plow including a frame member extending between said vertically spaced horizontal members of said clevis, and a generally vertical pivot pin passing through said horizontal members and said frame members.

7. The plow of claim 6 wherein said plow has a land side overlying unplowed ground when working, and said axle tube is mounted on the forward plow section at the rear thereof, and extends laterally across the rear portions of the forward plow section, said clevis member being positioned adjacent the land side of the forward section, and said means to releasably retain being spaced laterally from said clevis and adjacent the opposite side of the rear portion of the forward section.

8. The combination of claim 5 wherein said front section and rear section form a plow frame, said means in addition to said land wheel assembly to support said plow frame with respect to the ground including a tail wheel assembly mounted at the rear of the plow frame, a furrow wheel assembly mounted at a first front corner of the plow frame, and a hitch pole connected adjacent the other front corner of the plow frame, and supportable on a prime mover, said hitch pole being pivotally connected to the plow frame about a horizontal axis, a first hydraulic cylinder assembly connected between the hitch pole and the plow frame and being controllable to change the pivot angle between the hitch pole and plow frame to control the plow frame height at said other front corner when the hitch pole is supported on a prime mover, and separate hydraulic cylinder assemblies for controlling each of said tail wheel assembly, said land wheel assembly and said furrow wheel assembly, means to connect the hydraulic cylinder assemblies for the furrow wheel assembly and hitch pole for parallel operation, and flow restrictor means to restrict flow to said first hydraulic cylinder assembly for said hitch pole and thereby control pressure available at the hydraulic cylinder assembly for said furrow wheel to obtain a desired orientation of the plow frame when the front corners of the plow frame are lowered into the ground.

9. The improvement of claim 8 and means to connect said cylinder assemblies for the land wheel assembly and the tail wheel assembly flow for parallel operation, and second restrictor means to restrict flow relative to the cylinder assembly for the tail wheel assembly to obtain lowering and raising of the portion of the plow assembly adjacent the land wheel assembly prior to full lowering and raising of the portion of the plow assembly supported by the tail wheel assembly.

* * * * *

UNITED STATES PATENT OFFICE
CERTIFICATE OF CORRECTION

Patent No. 4,121,852            Dated October 24, 1978

Inventor(s) Sherman H. Quanbeck

It is certified that error appears in the above-identified patent and that said Letters Patent are hereby corrected as shown below:

Column 8, line 35, after "said" insert --axle-- ;
Column 8, line 55 "said" should be --and-- .

Signed and Sealed this

Sixteenth Day of January 1979

[SEAL]

Attest:

RUTH C. MASON
Attesting Officer

DONALD W. BANNER
Commissioner of Patents and Trademarks